March 31, 1931.  C. W. LEGUILLON  1,798,798
HOSE AND METHOD OF MAKING THE SAME
Filed March 6, 1929
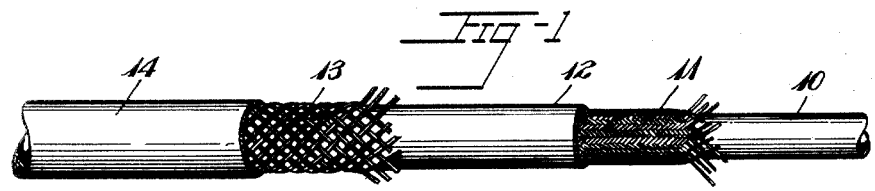
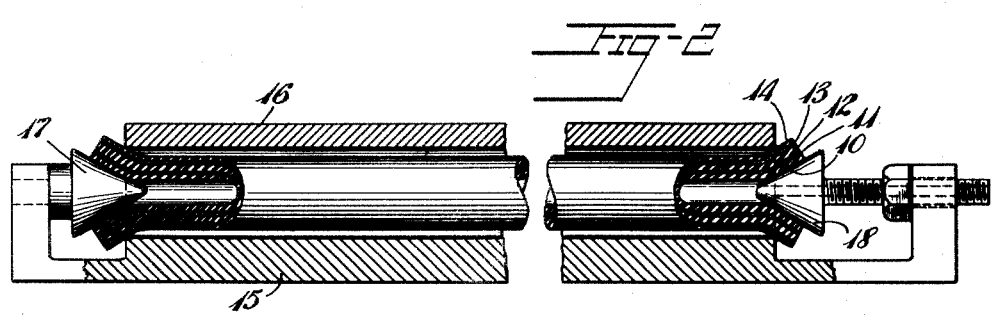
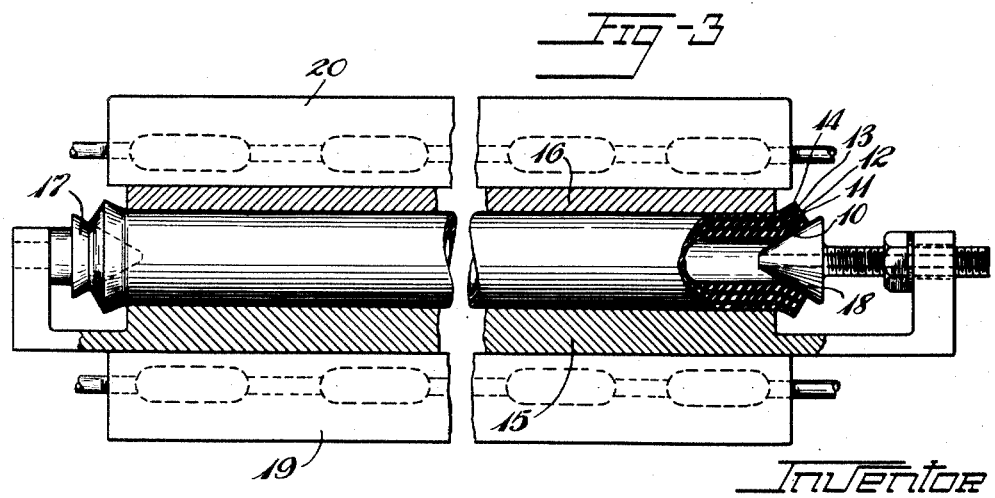
Inventor
Charles W. Leguillon
By Eakin & Avery Attys.

Patented Mar. 31, 1931

1,798,798

UNITED STATES PATENT OFFICE

CHARLES W. LEGUILLON, OF AKRON, OHIO, ASSIGNOR TO THE B. F. GOODRICH COMPANY, OF NEW YORK, N. Y., A CORPORATION OF NEW YORK

HOSE AND METHOD OF MAKING THE SAME

Application filed March 6, 1929. Serial No. 344,639.

This invention relates to conducting hose and methods of making the same.

My chief objects are to provide a hose adapted to withstand high internal pressure with but little expansion, as is required in hose used in hydraulic braking systems in automobiles, for example; to provide a convenient and effective procedure for producing such hose; to provide economy of manufacture; and to provide hose adapted for long service without deterioration.

When hose is manufactured by winding rubberized fabric upon a mandrel, binding it to the mandrel by a fabric wrap and curing it in that condition the fibrous elements of the hose are not set in such a stretched condition in the hose as to avoid substantial stretching of the hose in service, with consequent shifting of its elements with relation to each other such as to contribute to early deterioration of the hose.

Heretofore hose has been formed by extruding a lining tube of rubber and braiding one or more fibrous covers thereon, with or without the application of rubber layers between the braidings, mounting the hose in a lead sheath or other mold while the lining tube is in an unvulcanized condition, and then vulcanizing the hose while holding it distended by internal fluid pressure, but in such procedure the threads of at least the innermost braiding are permitted to retract by the softening of the rubber during vulcanization, the rubber relatively being pushed outward between the threads, and the result is that the threads are not set in a sufficienly stretched condition in the finished hose and their retraction in the softened rubber results in poor compacting and poor adhesion of plies and irregularity of the inner surface of the hose.

In both of the prior types of hose just described the stretching of the hose in service contributes to rapid deterioration because of relative movement of the elements within the hose as an incident of the stretching and the poor compacting of the plies in the procedure last described operates against the desideration of a thin and consequently flexible wall.

I attain the several objects set out above by providing as one of the fibrous layers, and preferably the innermost layer, a fabricated sheet such that it will not be easily previous to the rubber which is urged to flow outward through its interstices by the internal fluid pressure, preferably by employing a very close-meshed fibrous sheet such as may be provided by a close braiding of fine threads upon the lining tube of the hose, the smallness of the mesh being such that rubber, although softened, will not readily flow therethrough, and preferably, for better bridging across of the meshes of the fibrous layer, I semi-cure the lining-tube of the hose before applying the first fibrous layer thereto.

Of the accompanying drawings:

Fig. 1 is a side elevation of a piece of hose embodying and made in accordance with my invention in its preferred form, parts being removed for fullness of illustration.

Fig. 2 is a vertical section of the hose and a mold therefor as they are just before the hose is distended within the mold.

Fig. 3 is a side elevation of parts of a platen press and the mold and hose therein, parts of the mold and hose being sectioned and broken away.

Referring to the drawings, the hose of the preferred embodiment here shown comprises a lining tube 10 of rubber composition, which preferably is formed by extrusion and then partially vulcanized, after which a fine-mesh or tight-weave tubular layer 11 of thread is braided thereon. A tubular layer 12 of unvulcanzied rubber composition is then placed upon the fibrous layer 11 by means of an extruding machine, after which another fibrous layer 13, which for flexibility, strength or economy of material may be of open mesh threads as shown, is braided upon the rubber layer 12, and a rubber cover 14 is applied by extrusion.

Although, in the preferred embodiment of the invention, rubber composition is applied to the thread or fibrous layers by extrusion, it will be understood that the layers may be rubberized in any suitable manner, either before or after application of the layers to the hose.

A length of the hose built up as described is then mounted in a surrounding mold structure, which may be a two-part mold 15, 16 as shown, is distended in the mold, as by means of the end closure plug 17 and fluid conducting plug 18 and is vulcanized while it is held distended, as by mounting the mold between the platens 19, 20 of a steam heated platen press.

During the vulcanization the semi-cured lining tube 10 retains sufficient consistency to bridge across between the threads of the braided layer 11, especially when the layer 11 is of tight weave, and prevents displacement of the threads by retraction as an incident of the heating.

As the semi-cured lining tube, backed by the close-weave tube 11, continues to be impervious throughout the cure, the distending fluid is not permitted to stretch the outer layers or plies of the hose away from those nearer its inner surface.

As my invention is susceptible of modification without sacrifice of all of the above stated advantages I do not wholly limit my claims to the exact construction or procedure described.

I claim:

1. A hose comprising a rubber lining tube, a relatively close-weave fibrous layer surrounding said tube and a rubberized thread layer of relatively open structure surrounding said close-weave layer, all compacted and vulcanized together.

2. The method of making a hose which comprises forming a rubber lining tube, mounting in succession thereon a relatively close-weave fibrous layer and a rubberized thread layer of relatively open structure and vulcanizing the resulting structure while holding it distended in a mold by internal fluid pressure.

3. The method of making a hose which comprises forming and semi-curing a rubber lining tube, mounting in succession thereon a relatively close-weave fibrous layer and a rubberized thread layer of relatively open structure and vulcanizing the resulting structure while holding it distended in a mold by internal fluid pressure.

4. The method of making a hollow article which comprises assembling an inner layer of fibrous material and rubber composition, the fibers thereof being arranged sufficiently close to each other and the composition being of such resistance to flow at the vulcanizing temperature as to prevent substantial relative movement of said fibrous material and said composition during vulcanization, and an outer rubberized layer of relatively widely-spaced threads, and vulcanizing the resulting structure while holding it distended in a mold.

5. The method of making a hollow article which comprises assembling a lining of rubber composition, a contiguous layer of woven fibrous material, the composition being of such resistance to flow at the vulcanizing temperature and the fibrous material being so close-woven as to prevent substantial relative movement of said material and composition during vulcanization, and an adjacent rubberized layer of relatively widely-spaced threads, and vulcanizing the resulting structure while holding it distended in a mold.

6. The method of making a hollow article which comprises forming a lining of rubber composition, semi-curing said lining, mounting thereon a layer of fibrous material, the composition being of such resistance to flow at vulcanizing temperatures and the fibers of said material being so close to each other as to prevent substantial movement of the fibers and the composition relative to each other during vulcanization, mounting thereon a rubberized layer of relatively widely-spaced threads, and vulcanizing the resulting structure while holding it distended in a mold.

7. A hollow article comprising a layer of fibrous material in association with a rubber composition, the fibers of said layer being arranged relatively close to each other, and a rubberized reinforcement of threads having relatively wide spacing superimposed on said first mentioned layer, the whole being compacted and vulcanized together.

8. A hollow article comprising a layer of relatively close-weave fibrous material in association with a rubber composition, and a rubberized reinforcement of threads having relatively wide spacing superimposed on said first mentioned layer, the whole being compacted and vulcanized together.

9. A hollow article comprising a lining of rubber composition, a layer of fibrous material mounted thereon, the fibers thereof being relatively closely-associated, and a rubberized reinforcement of threads having relatively wide spacing, the whole being compacted and vulcanized together.

In witness whereof, I have hereunto set my hand this 2nd day of March, 1929.

CHARLES W. LEGUILLON.